Feb. 14, 1950
H. H. CURRY
2,497,113
INDUCTION GENERATOR
Filed Feb. 21, 1946
2 Sheets-Sheet 1
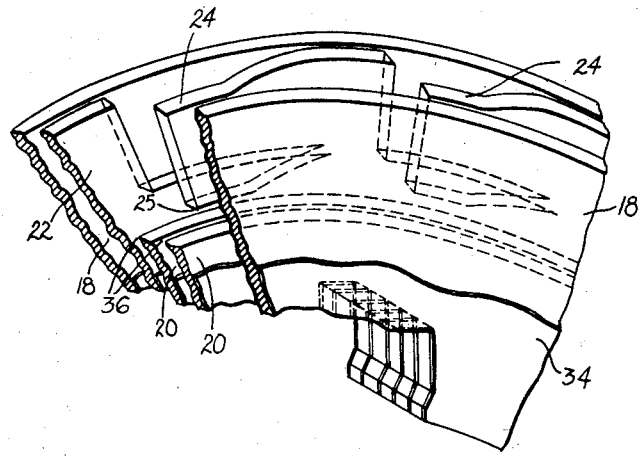
FIG. 3
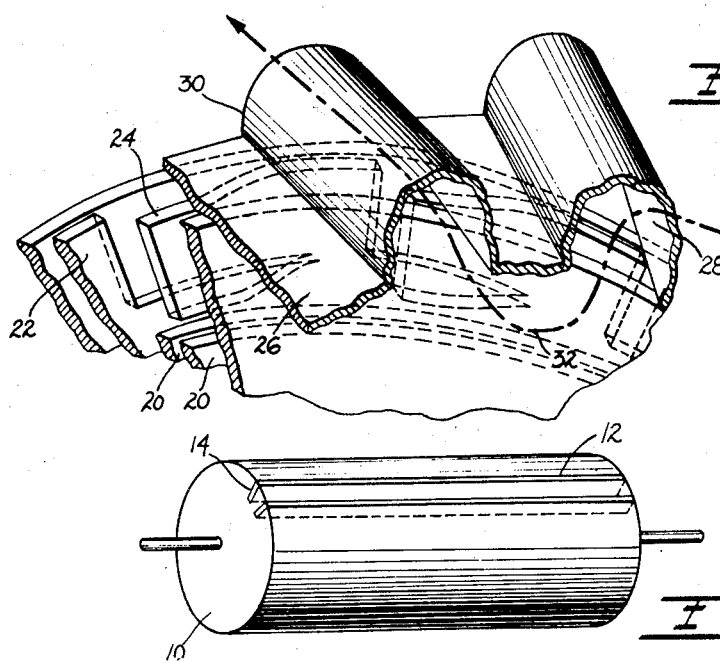
FIG. 4
FIG. 1
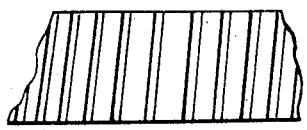
FIG. 2
INVENTOR.
HERMAN H. CURRY
BY M. O. Hayes
ATTORNEY Feb. 14, 1950 H. H. CURRY 2,497,113
INDUCTION GENERATOR
Filed Feb. 21, 1946 2 Sheets-Sheet 2
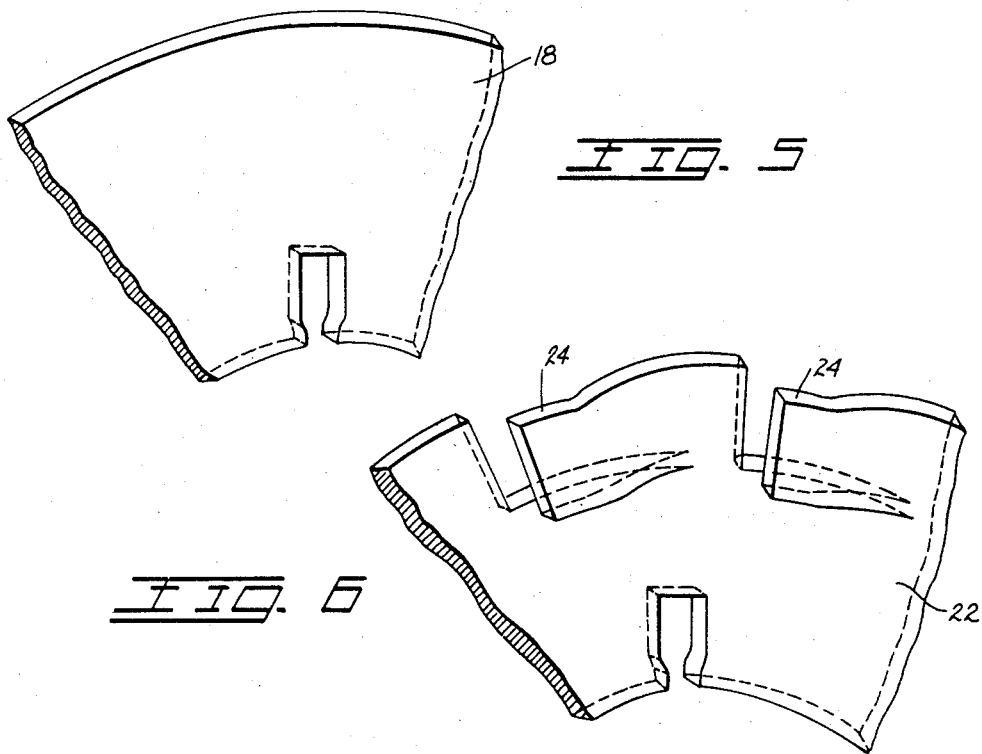
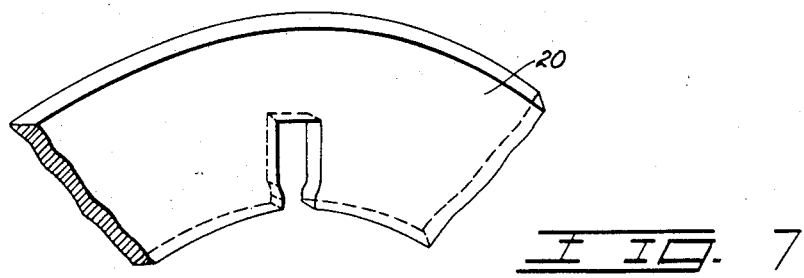
INVENTOR.
HERMAN H. CURRY
BY *M. O. Hayes*
ATTORNEY Patented Feb. 14, 1950

2,497,113

UNITED STATES PATENT OFFICE 2,497,113

INDUCTION GENERATOR

Herman H. Curry, United States Coast Guard

Application February 21, 1946, Serial No. 649,429

6 Claims. (Cl. 172—120)

(Granted under the act of March 3, 1883, as amended April 30, 1928; 370 O. G. 757)

This invention relates in general to an induction generator, and in particular to such a generator for high-speed operation.

Until recently, there has been no great demand for high-speed units as a two-pole synchronous generator need operate at only 3600 R. P. M. to supply the standard 60 cycle frequency. In certain fields requiring higher frequencies, as in aviation art, wherein 400 cycles is standard, the only prime movers heretofore used have been reciprocating internal-combustion engines of limited speed, therefore necessitating multi-pole generators for direct drive to supply the requisite frequency. It has presently become desirable to provide a generator unit capable of direct drive from a high speed prime mover, such, as a gas turbine or turbo compressor. Such a unit is extremely useful in connection with jet-propelled aircraft for supplying auxiliary power, which may be used, for example, for driving auxiliary propellers for added thrust at low altitudes and speeds, as described and claimed in my copending application, Serial No. 644,988, filed February 1, 1946, now abandoned, and for other power purposes requiring both a high speed and high frequency.

Gas turbines are inherently preferable of a very high speed in the smaller and moderate sizes and operate efficiently at speeds in the order of 25,000 R. P. M. Since a standard aviation frequency of 400 cycles per second allows an operating speed of some 24,500 R. P. M. for a two-pole induction generator, it is apparent that a direct drive between turbine and generator is possible providing an induction generator suitable for such high-speed operations is employed.

An object of the present invention, therefore, is to provide such an induction generator suitable for very high speeds of rotation.

Another object is to provide an induction-type generator utilizing a solid rather than a laminated rotor with the same material forming both the electrical and magnetic circuits of the rotor.

Another object is to provide such a rotor with the surface longitudinally laminated in sections to minimize losses due to slot-frequency rotor currents and iron losses incident to stator slot frequency variation in flux, but having all the rotor material available for fundamental slip-frequency rotor current.

Another object is to provide an induction generator with a smooth all-iron rotor in combination with a skewed-slot stator.

Another object is to provide a novel means for cooling a generator.

Further objects and advantages of this invention, as well as its construction, arrangement and operation, will be apparent from the following description and claims in connection with the accompanying drawings, in which:

Fig. 1 is a diagrammatic illustration of an induction generator rotor embodying the principles of this invention.

Fig. 2 is a fragmentary section of a skewed slot stator for use in combination with the rotor of Fig. 1.

Fig. 3 is a fragmentary view showing the novel means for cooling the induction generator in accordance with this invention.

Fig. 4 is a fragmentary view showing a section as in Fig. 3 with covering means therefor.

Fig. 5 is a fragmentary view showing one of the laminated sections of Fig. 3.

Fig. 6 is a fragmentary view showing the baffle construction of another of the laminated sections of Fig. 3.

Fig. 7 is a fragmentary view showing still another of the laminated sections of Fig. 3.

Fig. 1 shows a rotor 10, preferably of solid construction of low-resistance iron rather than the conventional laminated iron copper construction, so as to provide a mechanically strong unit allowing high speeds of rotation. By use of a smooth solid unit, all of the rotor air-gap surface is made available as a magnetic path and some flux concentration due to the usual rotor slots is avoided. This effective use of rotor iron together with the use of a close air gap as described below reduces magnetizing current and the amount of leading exciting current required. All of the material in the solid rotor is also made available for secondary current thus tending to compensate by the added effective area for the greater specific resistance of the iron over copper.

While the increased inductance of such a rotor would be a serious disadvantage in a motor, reducing starting torque and pull out torque, these characteristics are not of such major importance in an induction generator operating at low normal slip with a low slip frequency in rotor iron. Rotor losses from excitation current and iron losses at slip frequency will not be excessive and a smooth solid all iron rotor may be successfully utilized.

A smooth solid rotor, however, operating with conventional stator slots in a high-frequency generator may have excessive losses from slot-frequency harmonics, and due to the high frequency of these and to the inductance of a solid iron rotor, these losses will be confined largely to near the surface by skin effect.

In accordance with another embodiment of the present invention, to reduce these high-frequency losses, very narrow and shallow slots 12 are cut in the rotor surface parallel to the rotor axis. These slots 12 are filled by iron strips welded to the solid rotor iron at the ends, as at 14, and insulated from, but bonded to, the rotor iron except at the welded ends.

In accordance with a further part of this invention, it is proposed to use the rotor described above having either a smooth solid all-iron construction or having narrow welded strips, with a stator having closed or iron-wedged skewed slots, such as illustrated in Fig. 2. Alternatively, a stator may be used which has slots parallel to its axis in combination with a rotor having welded strips, such as described above, but in which the strips are skewed.

In order to reduce the magnetizing current of the rotor, and thus the leading excitation kva. (kilovolt amperes) required by the generator, it is proposed to reduce the air gap to a minimum. In a larger unit, normally cooled by radial ventilation and air flow through the air gap, the rotor heat is conducted to the ends and dissipated to the air by cooling fins or fan blades in a manner well known to the art. In such a unit, the solid construction of the rotor is especially advantageous in that it provides good heat conduction longitudinally and heat is readily conducted to the ends where it may be dissipated.

In order to cool the stator a novel construction is proposed as shown in Figs. 3 through 7. In accordance with this feature of the invention, the stator laminations are so formed to give the result shown in exaggerated thickness in Figs. 3 and 4. Groups of two or more wide laminations 18 (see Figs. 3-7, especially Fig. 3), shown separately in Fig. 5, are separated by one or more rings of narrow laminations 20, shown in detail in Fig. 7, and by a ring 22, having baffle sections 24, as shown in detail in Fig. 6, so bent as to lap over the narrow sections 20. A clearance is left between the bottom of the baffles 24 and the top of the sections 20, as at 25, so as to provide a passage for cooling fluid. The narrow laminations 20 are of such width as to provide an adequate flux path past the winding slot 26 and to yet allow a cooling passage, as at 25, between the top of the section and the bottom of baffle 24. A plurality of such groups of laminations comprise the assembled stator element.

A cover section 26, Fig. 4, is placed around the periphery of the stator so that, when assembled, radial passages are formed for the circulation of a cooling fluid from intake ducts as 28, inward to near the windings beneath the baffles 24 then radially outward to an outlet duct as 30. The passage of the cooling fluid is shown by the dashed line 32 in Fig. 4. Forced circulation of oil or other cooling liquid as well as a gaseous cooling medium such as air or hydrogen through the cooling system is within the scope of this invention. In the embodiment shown in Fig. 4, every other one of the openings in the cover 26 may be used as intake ducts while the remaining ducts are used as outlets.

The elasticity of the bent laminations are depended upon to make only an approximately fluid-tight joint between the laminated sections 20 and baffles 24 forming the sides of the U-shaped passages. The laminations are elsewhere bonded together at least near the winding slots and air gap to make a fluid-tight assembly by any conventional method, such as by assembling under high pressure and temperature after coating with a thermosetting plastic.

Optionally, the surfaces of the laminations may be bonded together for only a short distance above the winding slots and air gap as shown at 34 (Fig. 3) leaving a small clearance between laminations, as at 36, so as to allow the cooling fluid to penetrate between the laminations closer to the source of heat. By coating each lamination with a suitable thermosetting plastic near the air gap and around the winding slot, and then heating the unit while assembled under axial pressure, a solid and rigid hum-free structure is obtained, heat conductivity between the laminations is increased, the cooling passages are sealed from the air gap, and the winding slots are electrically insulated by the plastic.

By means of the above-described cooling system, heat is effectively transferred to the cooling medium from the edge of each stator lamination as near to the source of heat as practically possible, and at the same time the novel construction allows a light compact construction.

Heat flow across the laminations is reduced by the division of the laminations into a plurality of peripheral channels through which the cooling fluid is circulated. The cooling fluid is circulated close to the air gap; however, no ventilating or cooling passages enter the air gap, thus the entire cylindrical surface of the stator at the air gap may be used for magnetic flux.

The intensive cooling allows a high power output per unit weight for a high-speed generator and is thus particularly suited to aviation purposes. The stator hereinbefore described is claimed in my copending application, Serial No. 24,292, filed April 30, 1948, entitled "Induction generator."

Various changes can be made in the above embodiment of this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a high-speed induction generator; an all-iron rotor, longitudinally disposed slots in the surface of said rotor and iron strips within said slots.

2. In a high-speed induction generator; an all-iron rotor, narrow, shallow slots longitudinally disposed in the surface of said rotor, and iron strips within said slots electrically bonded to said rotor at each end.

3. In a high-speed induction generator, an all-iron rotor element, narrow shallow slots in the surface of said rotor element, iron strips within said slots electrically bonded to said rotor element at each end, and a slotted stator element, the slots in one of said elements being skewed with relation to the axis of said element.

4. A high-speed induction generator comprising a rotor element and a stator element and a minimum air gap between said elements, said rotor element being formed as an all-iron member having longitudinal slots in the surface thereof and iron strips within said slots, and cooling means for said stator element comprising means defining a plurality of channels around the periphery of said stator element for circulation of a cooling fluid.

5. In a high-speed induction generator having a rotor element, a stator element and a minimum air gap between said elements, said rotor element comprising a solid piece of iron having slots therein, iron strips within said slots, said rotor and said stator elements being cooperable to minimize the production of slot-frequency currents in said rotor and for localizing such slot-frequency currents as are produced in a region adjacent said air gap, and cooling means for said stator element comprising means defining a plurality of channels around the periphery of said stator element and extending radially therethrough for the circulation of a cooling fluid from the periphery radially toward said gap.

6. In a high-speed induction machine, an all-iron rotor having narrow shallow slots longitudinally disposed in the surface of said rotor, and iron strips within the slots, said strips being mutually electrically interconnected at the ends thereof.

HERMAN H. CURRY.

REFERENCES CITED

The following references are of record in the file of this patent:

UNITED STATES PATENTS

| Number | Name | Date |
|---|---|---|
| 543,223 | Trudeau | July 23, 1895 |
| 606,912 | Blathy et al. | July 5, 1898 |
| 630,333 | Dietrich | Aug. 8, 1899 |
| 771,468 | Falk | Oct. 4, 1904 |
| 980,986 | Meyer | Jan. 10, 1911 |
| 1,185,461 | Alexanderson | May 30, 1916 |
| 1,360,482 | Wiard | Nov. 30, 1920 |
| 1,517,306 | Mills | Dec. 3, 1924 |
| 1,601,531 | Jeannin | Sept. 28, 1926 |
| 1,686,027 | Newbury | Oct. 2, 1928 |
| 1,918,763 | Lincoln et al. | July 18, 1933 |
| 2,068,820 | Sarazin et al. | Jan. 26, 1937 |
| 2,286,008 | Pfalzgraff | June 9, 1942 |
| 2,372,590 | Ljunggren et al. | Mar. 27, 1945 |
| 2,387,073 | Horlacher | Oct. 16, 1945 |
| 2,421,860 | Winther | June 10, 1947 |
| 2,423,869 | Blessing | July 15, 1947 |

FOREIGN PATENTS

| Number | Country | Date |
|---|---|---|
| 74,544 | Germany | Apr. 12, 1894 |
| 266,780 | Great Britain | Mar. 4, 1927 |